United States Patent
Mohiuddin et al.

(10) Patent No.: US 7,614,836 B2
(45) Date of Patent: Nov. 10, 2009

(54) ARRANGEMENTS FOR ATTACHING COMPONENTS TO SURFACES

(75) Inventors: Gulam Mohiuddin, Troy, MI (US); Gregory A. Nadlicki, Clawson, MI (US); Joseph T. Cusumano, Shelby Township, MI (US); Anna L. Dunnigan, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 300 days.

(21) Appl. No.: 11/430,618

(22) Filed: May 9, 2006

(65) Prior Publication Data

US 2007/0261332 A1 Nov. 15, 2007

(51) Int. Cl.
*F16B 19/00* (2006.01)
*F16B 21/00* (2006.01)
*E04C 2/38* (2006.01)

(52) U.S. Cl. .................... 411/510; 411/508; 411/512; 52/716.7; 52/707

(58) Field of Classification Search ............... 52/716.5, 52/716.6, 716.7, 707, 709, 718.03; 411/508, 411/509, 510, 913, 512
See application file for complete search history.

(56) References Cited

U.S. PATENT DOCUMENTS

| | | | | |
|---|---|---|---|---|
| 3,099,931 A * | 8/1963 | Ferdinand | | 411/15 |
| 3,213,745 A * | 10/1965 | Dwyer | | 411/15 |
| 3,593,612 A * | 7/1971 | Schulze | | 411/15 |
| 3,810,279 A * | 5/1974 | Swick et al. | | 411/509 |
| 4,422,276 A * | 12/1983 | Paravano | | 52/511 |
| 4,927,287 A * | 5/1990 | Ohkawa et al. | | 403/408.1 |
| 4,938,645 A * | 7/1990 | Wollar | | 411/508 |
| 5,039,267 A * | 8/1991 | Wollar | | 411/508 |
| 5,387,065 A * | 2/1995 | Sullivan | | 411/48 |
| 5,393,185 A * | 2/1995 | Duffy, Jr. | | 411/510 |
| 5,775,860 A * | 7/1998 | Meyer | | 411/46 |
| 5,797,714 A * | 8/1998 | Oddenino | | 411/508 |
| 6,039,523 A * | 3/2000 | Kraus | | 411/48 |
| 6,431,585 B1 * | 8/2002 | Rickabus et al. | | 280/728.3 |
| 6,769,849 B2 * | 8/2004 | Yoneoka | | 411/45 |
| 7,001,128 B2 * | 2/2006 | Kuntze | | 411/508 |
| 7,188,393 B2 * | 3/2007 | Kawai | | 24/297 |
| 7,281,303 B2 * | 10/2007 | Terrill et al. | | 24/453 |
| 7,481,474 B2 * | 1/2009 | Higgins et al. | | 296/1.08 |
| 2004/0151560 A1 * | 8/2004 | Kirchen | | 411/508 |
| 2008/0260488 A1 * | 10/2008 | Scroggie et al. | | 411/45 |

FOREIGN PATENT DOCUMENTS

EP 1323932 B1 4/2005

* cited by examiner

*Primary Examiner*—Richard E Chilcot, Jr.
*Assistant Examiner*—Brent W Herring

(57) ABSTRACT

An arrangement is provided for attaching an automotive surface component, such as a carpet and/or trim, to a primary surface on an automotive panel forming a wall of an automotive structural member, such as a rocker panel. The automotive panel has a space therebehind and holes therethrough. Plug portions of plug fastener assemblies having hollow bodies are pressed through the holes prior to filling the space behind the panel with foam. Fastener insert portions of the plug fastener assemblies for retaining carpet and/or other automotive surface components, such as trim strips, are inserted into the hollow bodies of the plug portions. Cooperating shoulders and flanges hold the plug portions in the panel and cooperating shoulders and flanges hold the fastener insert portions in the hollow bodies of the plug portions. While the use described is for rockers in automotive vehicles, the plug fastener arrangement is usable as fasteners for other purposes.

16 Claims, 6 Drawing Sheets

ARRANGEMENTS FOR ATTACHING COMPONENTS TO SURFACES

FIELD OF THE INVENTION

This invention relates to arrangements for attaching components to surfaces. More particularly, the present invention relates to attaching automotive components to foam-filled structures, such as foam-filled rockers, and to other structures such as pillars of automotive bodies, as well as to fastener plug assemblies used for these and other purposes.

BACKGROUND OF THE INVENTION

Automotive vehicles usually have doors which are installed in automotive body openings having rocker panels defining bottoms of the openings. It is current practice to provide rockers with holes which receive fasteners from carpets or other surface components which extend into the interior of automotive cabins.

It is also current practice to fill spaces behind rockers with dense foam or wax in order to strengthen the framing of automotive vehicles, however the foam interferes with fasteners inserted through the holes making it necessary to plug the holes prior to foaming and to unplug the holes after foaming. Plugging and unplugging the holes is labor intensive, while the necessity of disposing of removed plugs adds material cost.

Accordingly, there is a need to provide alternative arrangements for attaching automotive surface components, such as carpets and trim to rocker panels, as well as to other framing components, such as for example cabin pillars. While attaching automotive components is a concern where there is material such as foam or wax behind a panel, there are other structures in other vehicles, such as boats, trains and aircraft, and in other industries, such as construction and appliance manufacturing, where materials of any type disposed behind panels might interfere with the mounting of fasteners.

SUMMARY OF THE INVENTION

An arrangement is provided for attaching a component to a surface of an element forming a wall defining a space behind the element, wherein there is at least one hole through the wall. The arrangement comprises a hollow plug portion of a fastener assembly for insertion in the element. The hollow plug portion has a hollow body extending through the element with the hollow plug portion being secured by a first flange engaging the surface of the element and with at least one shoulder on the hollow body engaging a rear surface of the element behind the surface. Material fills the space behind the element and surrounds the hollow body of the plug portion. An insert portion of the arrangement has at least second shoulders for engaging the at least one shoulder surface on the plug portion and a second flange overlying the first flange on the plug portion. A component holder associated with the second flange on the insert portion fastens the surface component to the surface of the element.

A fastener plug assembly attaches an automotive surface component to a primary surface on a panel that forms a wall of an automotive structural member defining a space. There is at least one hole through the panel for receiving a plug portion of the fastener plug. The plug portion has a hollow body extending into the space behind the panel. The plug portion is secured to the panel by a first flange engaging the primary surface of the panel. At least one shoulder on the hollow body engages a rear surface of the panel behind the primary surface. Foam or wax fills the space behind the panel and surrounds the hollow body of the plug portion. An insert portion of the fastener plug having at least second shoulders engages the shoulder surface on the plug portion of the fastener plug and has a second flange overlying the first flange on the plug portion. A component holder is associated with the second flange on the insert portion for fastening the surface component to the primary surface.

In another aspect of the invention, a fastener plug assembly is provided for attachment through a hole in a primary surface of a rocker panel of a vehicle prior to injecting foam or wax behind the rocker panel. The fastener plug assembly is used to attach a carpet or other surface component to the rocker panel. The faster plug comprises a plug portion for initial insertion through the hole in the panel, the plug portion having a hollow body defining a chamber formed about a longitudinal axis. First engagement shoulders are mounted resiliently on the body and extend laterally of the axis for engaging a rear surface of the panel. A first flange is disposed in spaced relation to the engagement shoulders for abutting the primary surface of the panel, while the engagement shoulders abut the rear surface of the panel. The first flange has an opening therethrough, wherein when the hollow body of the plug portion is inserted into the hole, the rear surface of the panel is exposed at a location adjacent to the chamber of the plug portion. An insert portion which fastens the carpet to the plug portion has a projection extending axially from a retainer flange. The projection has radially extending barbs for engaging the exposed rear surface of the panel adjacent to the first engagement shoulders on the hollow body portion of the plug, while the retainer flange engages the primary surface of the panel. A component holder extends from the second flange for fastening the carpet to the rocker panel.

In another embodiment of the invention, the plug fastener includes plug portion configured for initial insertion through the hole, the plug portion having a hollow body defining a chamber formed about at longitudinal axis. First engagement shoulders are resiliently mounted on the hollow body and extend outwardly of the axis for engagement with a rear surface of the panel. The plug portion further includes a first flange disposed in spaced relation to the first engagement shoulders for abutting the primary surface of the panel while the engagement shoulders abut the rear surface of the panel. A retainer member is disposed on the flange. The retainer member has a second shoulder facing toward the first shoulders on the hollow body. A resilient insert portion of the plug fastener is provided for retaining a vehicular component to the plug portion. The insert portion has a projection extending axially from a first flange with the projection having third shoulders thereon for engaging the second shoulder on the retainer member of the plug portion. The insert portion further has a second flange overlying the retainer member. A component holder extends from the second flange for securing surface components of an automotive assembly to the insert.

In a further aspect, the aforementioned automotive structural member is a rocker panel and the surface components include a carpet overlaid in part by trim.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
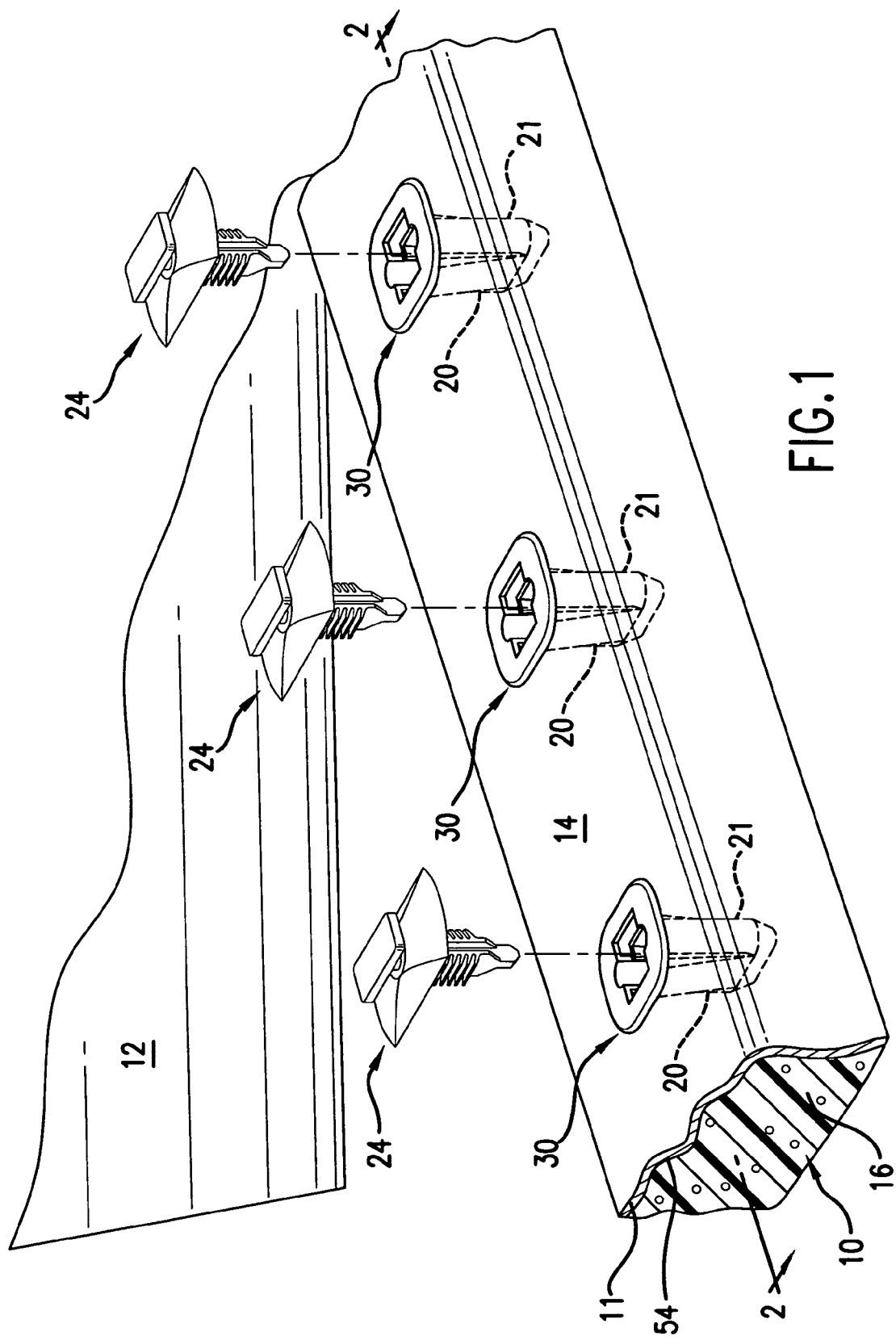
FIG. 1 is a perspective view of a portion of an automobile rocker having hollow plug portions therein and having fastener insert portions positioned for receipt in the hollow plug portions.
Figure 2:
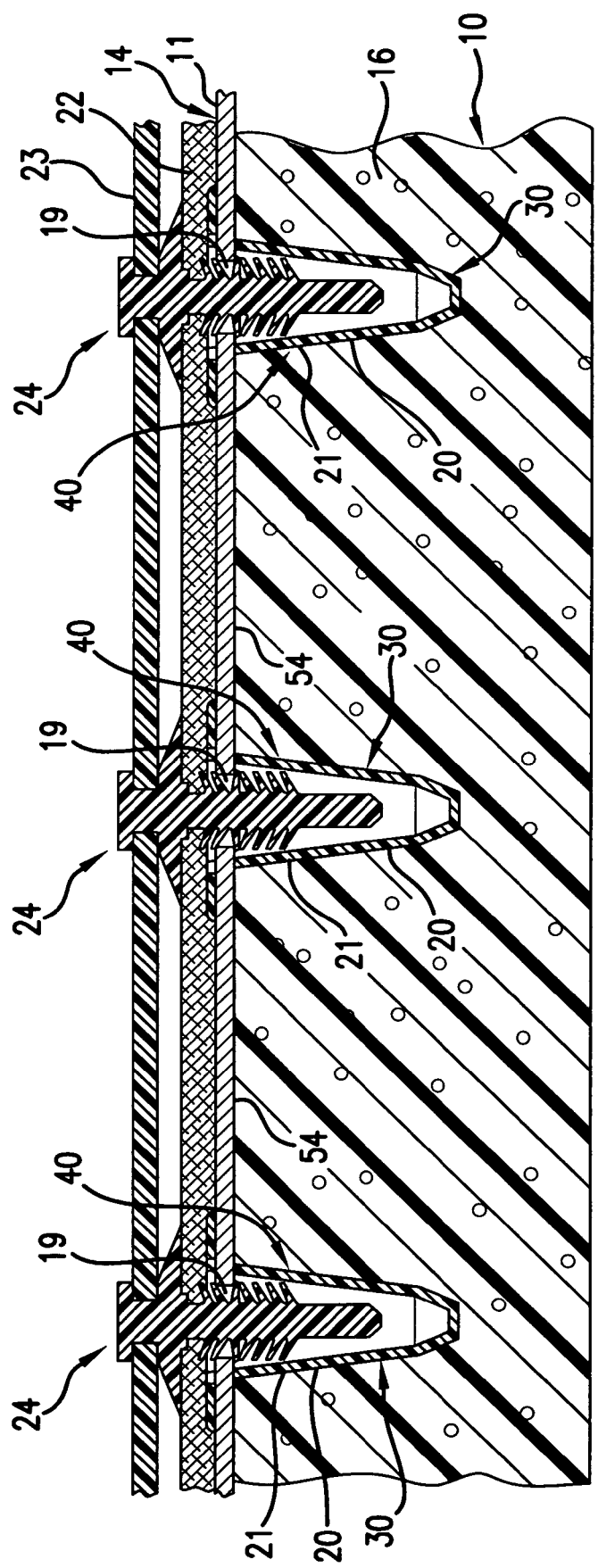
FIG. 2 is an elevation taken along lines 2-2 of FIG. 1, but showing the fastener insert portions inserted in the hollow plug portions and retaining a carpet and trim on the rocker panel.

Referring now to FIGS. 1 and 2, an automotive structural element such as a rocker panel 10 is disposed beneath an automobile door 12. The rocker 10 has a top panel 14 behind which foam 16 is injected. The foam 16 cures into a stiff, dense structure. The rocker panel 10 has holes 19 (FIG. 2) that extend through the top panel 14 into the reinforcing foam 16. The holes 19 align with the holes 20 in the foam 16. As is seen in FIG. 2, the holes 19 and 20 are used to anchor automotive surface components, which may be, for example, a carpet 22 that extends into the cabin of an automotive vehicle, the carpet being overlaid with a trim strip 23. The carpet 22 is attached by fastener inserts 24 inserted into the holes 19 and 20.

In accordance with the present invention, prior to injecting the foam 16, the holes 20 are defined by hollow plugs 30 that extend through the holes 19 in the rocker panel 11. The fastener insert portions 24 and hollow plug portions 30 together form fastener plug assemblies 40. The fastener plug assemblies 40 of FIG. 2 are configured in accordance with a first embodiment of the invention.

Figure 3:
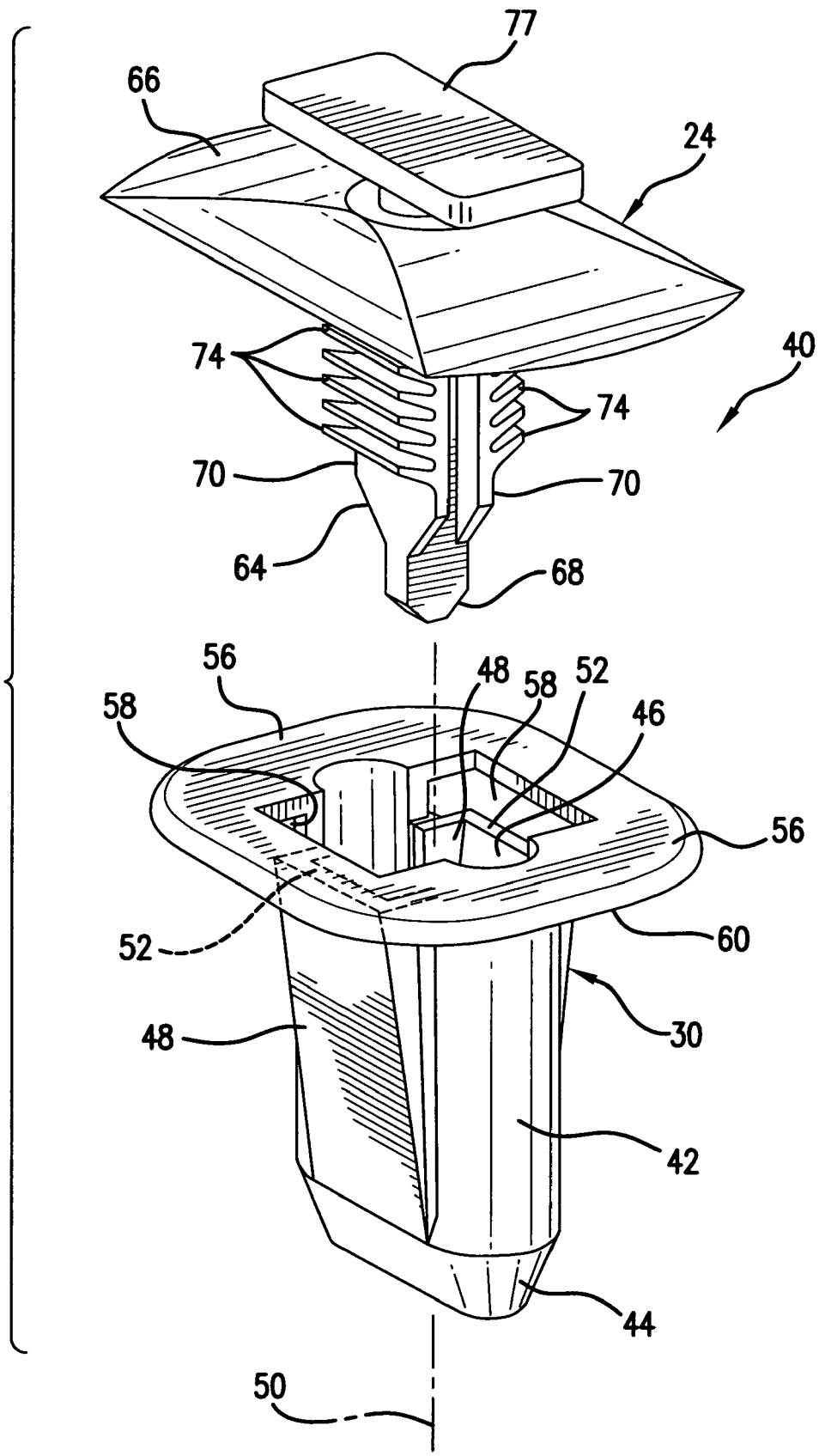
FIG. 3 is an exploded perspective view showing a first embodiment of a fastener plug prior to coupling an insert portion to a hollow plug portion.
Figure 4:
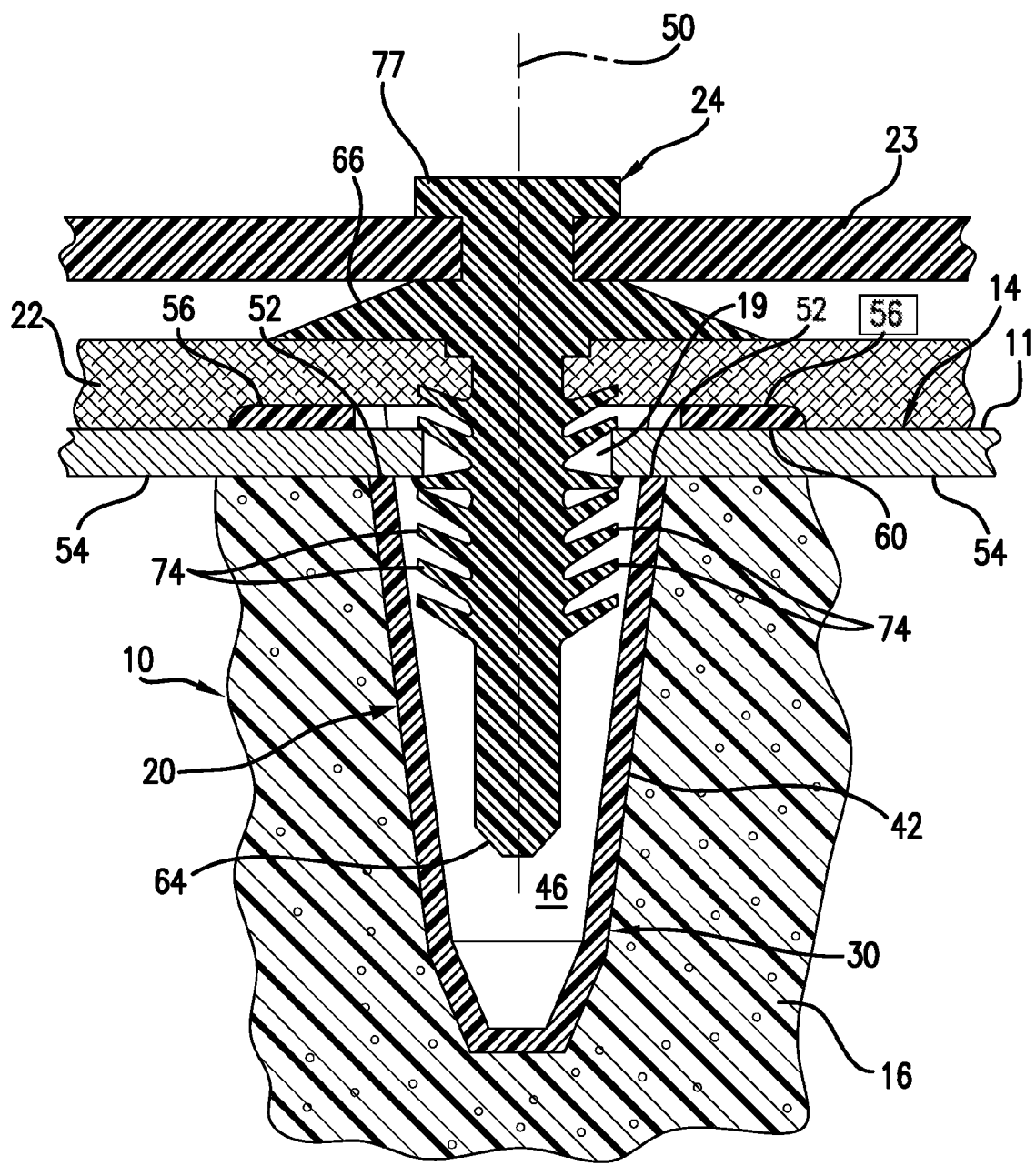
FIG. 4 is a side elevation showing the fastener plug of FIG. 3 with the fastener insert portion received in the hollow plug portion.

Referring now to FIGS. 3 and 4, the hollow plug portion 30 of the fastener plug assembly 40 has a hollow body 42 with a closed tapered bottom 44 that provides a chamber 46 which receives the fastener insert 24. The hollow plug 30 further has a pair of detent arms 48-48 that project laterally of the axis 50 of the hollow plug. The detent arms 48-48 have shoulders 52-52 which engage a rear surface 54 of the panel 14 of the rocker panel 10 having the primary surface 11 thereon (see FIGS. 1, 2 and 4).

Projecting laterally from the hollow body 42 of the hollow plug portion 30 is a first flange 56 which is axially spaced from the shoulders 52 by gaps 58-58. The first flange 56 has a bottom surface 60, which as is seen in FIG. 4, engages the primary surface 11 of the top panel 14 of rocker 10. As is shown generally in FIGS. 1 and 2 and as seen in FIG. 4, the hollow body 42 of the hollow plug portion 30 is inserted through one of the holes 19 in the top panel 14, initially deflecting the detent arms 48-48 inwardly toward the axis 50 until the edge of the top panel 14 defining the hole 19 aligns with the gaps 58-58 between the first flange 56 and the shoulders 52-52 on the detent arms 48-48. The detent arms 48-48 then expand, laterally placing the shoulders 52 adjacent the rear surface 54 of the top panel 14. This prevents the hollow plug portion 30 from being withdrawn back through the hole 19. To keep the hollow body 42 of the hollow plug portion 30 positioned in the hole 19 adjacent the primary surface 11 of the top panel 14, the first flange 56 engages the primary surface 11 of the top panel 14. As previously stated, after the hollow plug portion 30 is in place on the top panel 14, foam 16 (see FIGS. 1 and 2) is injected into the space behind the top panel 14 (see FIGS. 1 and 2). The foam 16 then solidifies with the hollow body 42 of the hollow plug portion 30 forming holes 20 ready to receive the fastener insert portion 24.

The fastener insert portion 24 of each plug assembly 40 each include a projection 64 projecting in the direction of the axis 50 from a second flange 66. The projection 64 has a tapered end portion 68 and pairs of side flanges 70 (see FIG. 3). The side flanges 70 have a width greater than the thickness of the end portion 68 and have a plurality of radially extending barbs or second shoulders 74 which slant upwardly toward the second flange 66. Upon inserting the projection 64 of the fastener insert portion 24 into the cavity 46 of the hollow body 42, the barbs or second shoulders 74 clear the edges of the hole 19 and catch on the rear surface 54 of the top panel 14 progressively as the projection 64 is pushed into the cavity 46 of the hollow plug portion 30. This prevents withdrawal of the fastener insert portion 24 from the hollow plug portion 30. The second flange 66 is preferably convex in shape with an outer surface that slopes away from the axis 50. Projecting above the second flange 66 is a component holder or retainer 77 which secures a surface member such as the plastic trim 23 (see FIGS. 2 and 4) in place over the carpet 22 on the rocker panel 10. The cavity 46 in the hollow body 42 allows unimpeded entry of the projection 64 into the hole 20 formed in the foam 16 by the hollow body 42. Since the carpet 22 is deformable, the carpet 22 is squeezed as the barbs or second shoulders 74 sequentially engage the rear surface 54 of the top panel 14.

While the fastener plug assembly 40 is illustrated as securing a carpet 22 and trim strip 23 to a rocker panel, the fastener plug assembly 40 may also be used to secure liners and/or trim to pillars defining the cabin of a vehicle and can be used as for other purposes, such as fastening liners and trim strips to window framing.

Figure 5:
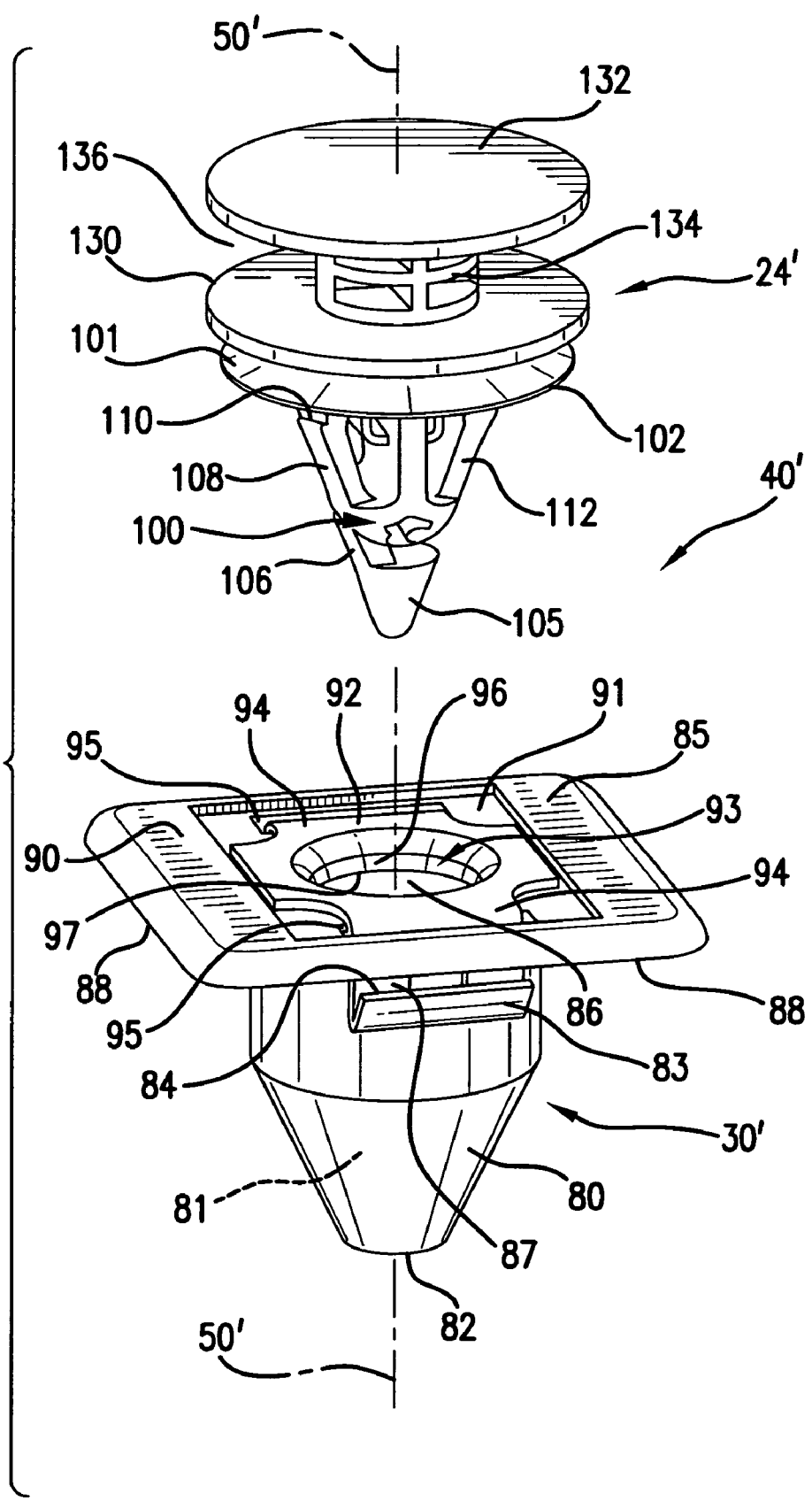
FIG. 5 is an exploded perspective view showing a second embodiment of the fastener plug prior to inserting a fastener insert portion into a hollow plug portion.
Figure 6:
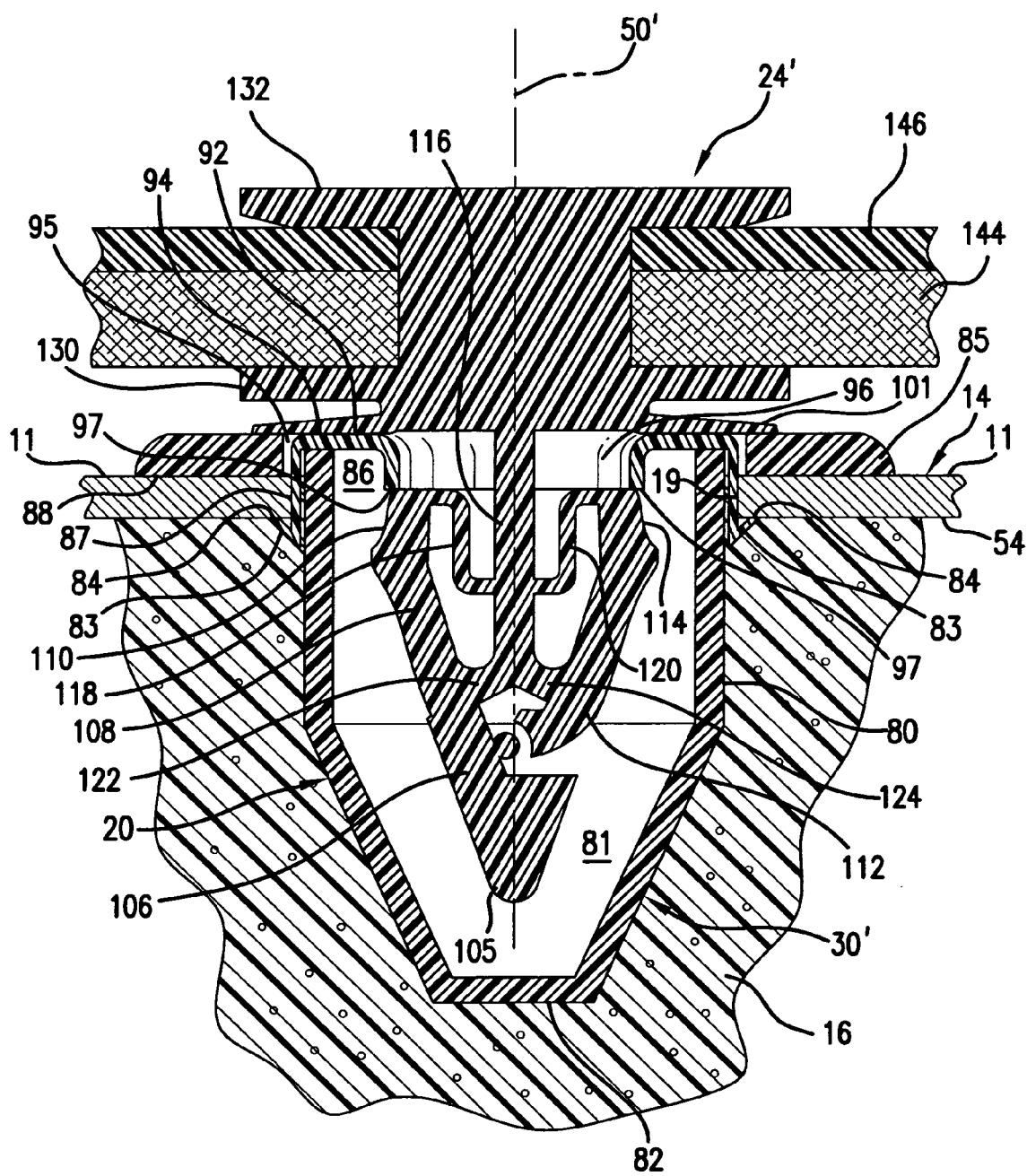
FIG. 6 is a side elevation showing the fastener plug of FIG. 5 with the fastener insert portion received in the hollow plug portion.

Referring now to FIGS. 5 and 6 where a second embodiment 40' of the fastener plug assembly is shown, a hollow plug portion 30' which receives a fastener insert portion 24' is used to anchor a web component, such as but not limited to, carpet 144 and trim 146 to a top panel 14 of a rocker 10. In this second embodiment, a hollow body 80 of the hollow plug portion 30' defines a chamber 81 having a closed end 82 that is retained on the top panel 14 by a pair of detent arms 83-83. Each detent arm 83 has a shoulder 84 that engages the rear surface 54 of the top panel 14. Engagement of the detent arms 83 with rear surface 54 of the top panel 14 prevents the hollow body 80 of the hollow plug portion 30' from being removed from the holes 19 and 20 (see FIG. 6). A first flange 85 is positioned at the open end 86 of the chamber 81 and engages the primary surface 11 of the top panel 14. The thickness of the top panel 14 is accommodated by gaps 87 between the shoulders 84 and the bottom surface 88 of the first flange 85. As is seen in FIG. 6, the hollow body 80 is retained within the hole 20 formed in the foam 16 after the foam 16 is injected behind the top panel 14 and expands against the hollow body 80. The hollow plug portion 30' is thus fastened securely in place.

The retainer flange 85 on the hollow plug portion 30' has an outer surface 90 with an indentation 91 therein which receives a metal retainer member 92 having an opening 93 therethrough which aligns with the open end 86 of the hollow body member 80. The retainer member 92 is held in place by resilient detents 94 that fix the retainer member to the first flange 85 by seating in recesses 95 formed in the indentation 91 in the first flange 85. The metal plate 92 has an annular collar portion 96 that defines the hole 93, the annular collar having a bottom edge 97, which as is seen in FIG. 6 retains the insert portion 24' in place.

Referring now more particularly to the insert portion 24' of FIGS. 5 and 6, it is seen that the insert portion has a projection 100 that extends in the direction of axis 50' from a convex flange 101. The convex flange 101 has an annular edge 102 which engages in slots 95 adjacent the retainer member 92. The projection 100 is conical and resilient due to its spring arm type structure and has a conical nose portion 105 that is connected by a first strut 106 which is unitary with a second strut 108 having a shoulder 110 thereon. A third strut 112 has a shoulder 114 thereon (see FIG. 6). The second and third struts 108 and 112 are in turn connected to a central post 116 by a pair of resilient webs 118 and 120 disposed adjacent one end and a pair of relatively stiff connections 122 and 124 disposed adjacent to the other end thereof. The struts 108 and 112 are thus resiliently biased outwardly and collapse sufficiently toward the central axis 50' when pushed into the cavity 81 of the hollow plug portion 30' so as to clear the annular edge 97 of the hole 93 defined by the metal collar portion 96 of insert 92 (see FIG. 5). The struts 108 and 112 expand laterally with respect to the axis 50' when inserted into the hollow plug portion 30' so as to seat the sloping shoulder portions 110 and 114 beneath the bottom edge 97 of the annular hole 93 in the retaining member 92. This prevents the insert 24' from being withdrawn from the hollow plug portion 30'.

Projecting above the second flange 101 of the fastener insert portion 24' is a retainer comprising third and fourth circular flanges 130 and 132 which are separated by a spacer 134 to provide an annular slot 136. The annular slot 136 receives a web material, such as a carpet 144, and plastic or metal trim strip 146, both which are retained in place by the upper flange or fourth circular flange 132 that holds the carpet 144 and trim 146 in place against the first disk or third circular flange 130.

While molded polymer materials are preferred for making the fastener plug assemblies 40 and 40', other materials such as metal and/or other plastic materials may be used.

While retaining carpet 22 and trim 23 on rocker panels 10 is the use illustrated in the foregoing description, the fastener plug assemblies 40 and 40' are also employed for other purposes, such as attaching surface components to pillars and window framing of automotive vehicles.

While reinforcing foam 16 is a preferred material for automotive vehicle applications, wax is also used. Materials other than foam or wax may be used for various applications, the hollow plug portions 30 serving to keep those materials from interfering with the fastener insert portions 24 that are inserted through the holes 19 in the panel 14. While the illustrated example is directed to fasteners for automotive vehicles, the plugs 30 and 30' are usable with aircraft, trains or marine conveyances and are usable in appliance manufacturing and for building construction. Any situation where a filling material of any sort is employed behind an element such as a wall, may employ fastener plug assemblies 40 and 40'.

From the foregoing description, one skilled in the art can easily ascertain the essential characteristics of this invention, and without departing form the spirit and scope thereof, can make various changes and modifications of the invention to adapt it to various usages and conditions.

We claim:

1. An arrangement for attaching a component to a surface of an element forming a wall defining a space behind the wall comprising:
    at least one hole through the element;
    a hollow plug portion of a fastener plug assembly in the element, the hollow plug portion having a hollow body extending through the element, the hollow plug portion being secured by a first flange engaging a primary surface of the element and at least one shoulder on the hollow body engaging a rear surface of the element behind the primary surface;
    material filling the space behind the element and surrounding the hollow body of the hollow plug portion;
    a fastener insert portion of the arrangement having barbs catching on the rear surface of the element and causing engagement of the rear surface on the hollow plug portion and a second flange overlying the first flange on the hollow plug portion; and
    a component holder associated with the second flange on the fastener insert portion for fastening the surface component to the primary surface of the element.

2. The arrangement of claim 1 wherein the material filling the space is foam or wax.

3. The arrangement of claim 1 wherein the element is a panel.

4. The arrangement of claim 1 wherein the element is a component of an automotive vehicle, marine vessel or aircraft.

5. The arrangement of claim 1 wherein the element is a component of an appliance or element of a building construction.

6. A fastener plug assembly for attachment in a hole through a primary surface of a panel in an automotive vehicle prior to foaming behind the panel, the fastener plug assembly comprising:
    a hollow plug portion for initial insertion through the hole in the panel, the hollow plug portion having a hollow body defining a chamber formed about a longitudinal axis;
    shoulders resiliently mounted on the hollow body of the hollow plug portion and extending laterally of the longitudinal axis for engagement with a rear surface of the panel;
    a first flange in spaced relation to the shoulders for abutting the primary surface of the panel while the shoulders abut the rear surface of the panel, the first flange having an opening therethrough, wherein when the hollow body of the hollow plug portion is inserted into the hole, the rear surface of the panel is inserted into the chamber defined by the hollow body of the hollow plug portion; and
    a fastener insert portion having a projection extending axially from a second flange, the projection having radially extending barbs catching on the rear surface of the panel adjacent to the shoulders on the hollow body of the hollow plug portion while the second flange overlies the primary surface of the panel, the fastener insert portion including a retainer extending from the second flange of the fastener insert portion for fastening surface components of the automotive vehicle to the panel.

7. The fastener plug assembly of claim 6 wherein the fastener insert portion has an axially extending body portion from which the radially extending barbs extend.

8. The fastener plug assembly of claim 7 wherein the radially extending barbs are arranged in two axially extending rows on opposite sides of the axially extending body portion.

9. The fastener plug assembly of claim 8 wherein the hollow plug portion has a closed bottom and a pair of detent arms having the shoulders.

10. The fastener plug assembly of claim 9 wherein the hollow plug portion and fastener insert portion are unitary molded members molded of polymer material.

11. An arrangement for attaching automotive surface components to a primary surface on a panel forming a wall of an automotive structural member defining a space, comprising:
   at least one hole through the panel;
   a hollow plug portion of a fastener plug assembly in the panel, the hollow plug portion having a hollow body extending through the panel, the hollow plug portion being secured by a first flange engaging the primary surface of the panel and at least one shoulder on the hollow body engaging a rear surface of the panel behind the primary surface;
   foam filling the space behind the panel and surrounding the hollow body of the hollow plug portion;
   a fastener insert portion of the fastener plug assembly having barbs catching on the rear surface of the panel and causing engagement of the rear surface on the hollow plug portion and a second flange overlying the first flange on the hollow plug portion; and
   a retainer associated with the second flange on the fastener insert portion for fastening the surface component to the primary surface.

12. An arrangement including a fastener plug assembly for attachment through a hole in a primary surface of an automotive rocker panel prior to foaming behind the panel, the fastener plug assembly comprising:
   a hollow plug portion for initial insertion through the hole in the panel, the hollow plug portion having a hollow body defining a chamber formed about a longitudinal axis;
   shoulders resiliently mounted on the hollow body and extending laterally of the longitudinal axis for engagement behind the panel, a first flange disposed in spaced relation with respect to the shoulders for abutting the primary surface of the panel while the shoulders abut a rear surface behind the panel; the first flange having an opening therethrough wherein when the hollow body is inserted into the hole, the rear surface of the panel is inserted into the chamber in the hollow plug portion;
   a fastener insert portion having a projection extending axially from a second flange, the projection having radially extending barbs catching on the exposed rear surface of the panel adjacent to the shoulders on the hollow body of the hollow plug portion while the second flange overlies the first flange and engages the primary surface of the panel; and
   a retainer extending from the second flange for fastening a component to the panel.

13. The arrangement of claim 12 wherein the second flange of the insert is concave with respect to the retainer member on the plug.

14. The arrangement of claim 12 wherein the plug is molded of polymer material with the retainer member being metal.

15. The arrangement of claim 12 wherein the resilient insert comprises a tapered nose portion connected to a pair of resilient struts, each strut having one of the first shoulders thereon, the struts being connected by a flexible web to a post extending away from the nose portion.

16. The arrangement of claim 12 wherein a strip of trim overlays a carpet and is retained behind the retainer.

* * * * *